(No Model.)
S. INGERSOLL.
ANTIFRICTION THRUST BEARING.
No. 488,816. Patented Dec. 27, 1892.
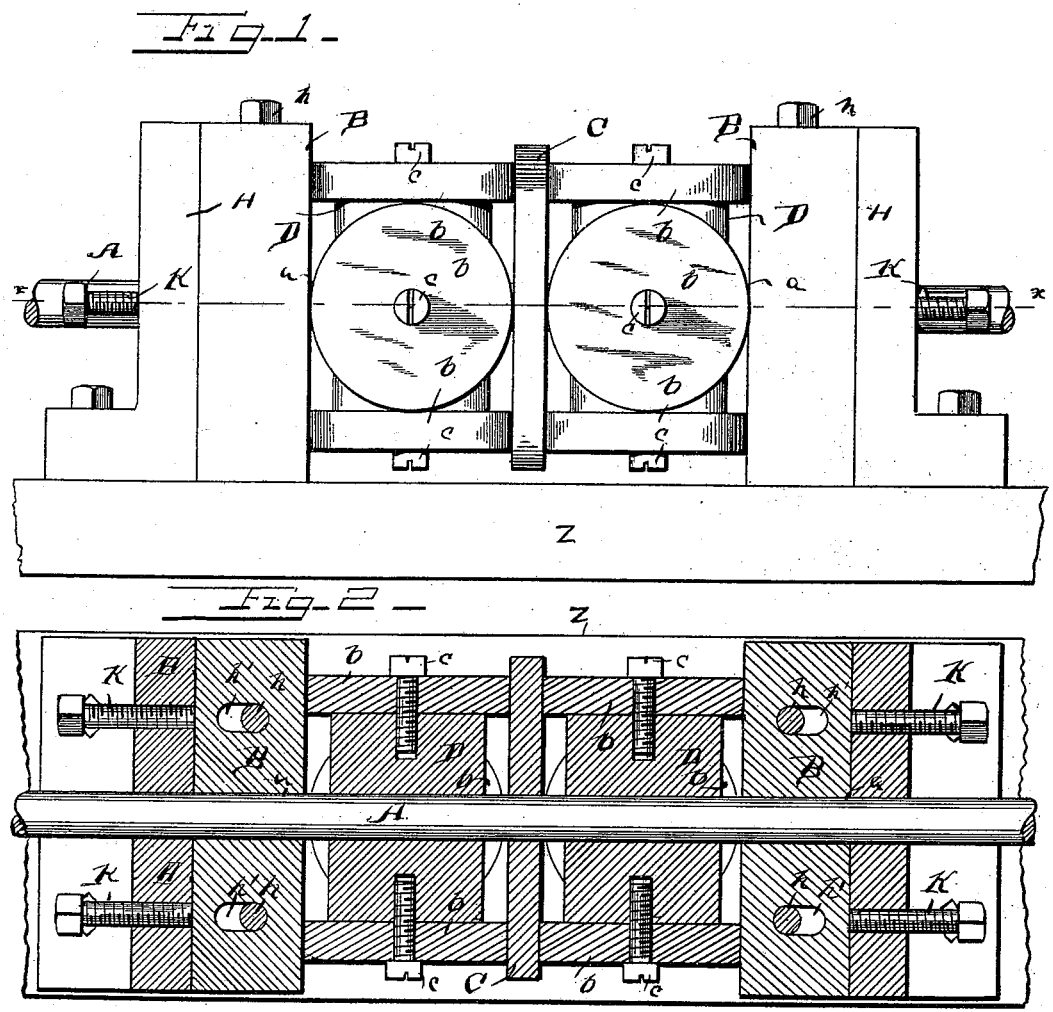
Witnesses
Jesse Heller.
Phil C. Mase.
Inventor
Simon Ingersoll,
by E. W. Anderson
his Attorney

UNITED STATES PATENT OFFICE.

SIMON INGERSOLL, OF GLENBROOK, CONNECTICUT.

ANTIFRICTION THRUST-BEARING.

SPECIFICATION forming part of Letters Patent No. 488,816, dated December 27, 1892.

Application filed April 21, 1892. Serial No. 430,058. (No model.)

*To all whom it may concern:*

Be it known that I, SIMON INGERSOLL, a citizen of the United States, and a resident of Glenbrook, in the county of Fairfield and State of Connecticut, have invented certain new and useful Improvements in Antifriction Thrust-Bearings; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a side elevation of the mechanism and Fig. 2 is a horizontal section of same taken on line $x\ x$ Fig. 1.

This invention has for its object the provision of certain novel devices for reducing friction in the thrust of propeller and other shafts, and it consists in the novel construction, and combination of parts, all as hereinafter specified.

In the accompanying drawings, the letter A designates a shaft, journaled in bearing plates B, B, in which it has bearings at $a, a$.

C is the main thrust bearing, which consists of a circular disk, fixed to the shaft, between the bearing faces of the bearing plates. Between this disk C and the bearing plates B, B, are loosely placed on the shaft, circular plates or disks D, D, one on each side of said disk C. These plates or disks D, D, carry each on their peripheries, a series of anti-friction rollers $b, b$, which turn in planes at right angles to the axis of the shaft, and are held in place by screws or pins $c$, which serve as their journals. These rollers, being confined between the bearing plates and the thrust bearing C, serve to take up, to a great degree, the friction of the endwise or longitudinal thrust of the shaft, and the greater this thrust, the more effective is their action.

The bearing plates B, B, are held to the base plate Z by means of the bolts $h, h$, which pass through slots $h', h'$, in said bearing plates and into the base plate. Against the bearing plates are the end blocks H secured to the base plate.

K, K, are set screws, which pass through the end blocks H and into engagement with the bearing plates. By means of these screws the plates B, B, can be adjusted to take up any wear or looseness.

It is obvious that if desired, the shaft A may be provided with more than one of the thrust bearings C, and that additional series of the anti-friction rollers may be employed in connection therewith.

The use of this device prevents almost entirely the heating of the bearings, resulting from the thrust of the shaft. It also effects a large saving of power.

Having described this invention, what I claim as new, and desire to secure by Letters Patent is:

The combination with the shaft, its adjustable slotted bearing plates B, B, and the bearing disk C fixed on said shaft, intermediate of the said bearing plates, of the disks D, D, on said shaft, one on each side of the disk C, the anti-friction rollers carried on the periphery of said disks, the end blocks H, H, against said bearing plates, said bearing plates being secured to the base by bolts passing through the slots therein, and into the base, and screws K, K, passing through said end blocks, and into engagement with said bearing plates, substantially as specified.

In testimony whereof I affix my signature in presence of two witnesses.

SIMON INGERSOLL.

Witnesses:
D. B. CAREY,
WM. F. WATERBURY.